United States Patent
Ma

(10) Patent No.: US 10,044,644 B2
(45) Date of Patent: Aug. 7, 2018

(54) PARALLEL REDUNDANCY PROTOCOL OVER WIDE AREA NETWORKS

(71) Applicant: ABB Schweiz AG, Baden (CH)

(72) Inventor: Xiaoguang Ma, Lake Mary, FL (US)

(73) Assignee: ABB Schweiz AG, Baden (CH)

( * ) Notice: Subject to any disclaimer, the term of this patent is extended or adjusted under 35 U.S.C. 154(b) by 41 days.

(21) Appl. No.: 15/397,184

(22) Filed: Jan. 3, 2017

(65) Prior Publication Data
US 2017/0195260 A1 Jul. 6, 2017

Related U.S. Application Data

(60) Provisional application No. 62/273,949, filed on Dec. 31, 2015.

(51) Int. Cl.
| | |
|---|---|
| *H04L 12/939* | (2013.01) |
| *H04L 29/14* | (2006.01) |
| *H04L 29/12* | (2006.01) |
| *H04L 12/28* | (2006.01) |
| *H04L 12/743* | (2013.01) |

(52) U.S. Cl.
CPC ........ *H04L 49/552* (2013.01); *H04L 12/2801* (2013.01); *H04L 12/2854* (2013.01); *H04L 45/7453* (2013.01); *H04L 61/2596* (2013.01); *H04L 69/40* (2013.01)

(58) Field of Classification Search
CPC .............. H04L 49/552; H04L 12/2801; H04L 12/2854
See application file for complete search history.

(56) References Cited

PUBLICATIONS

Rentschler, M.; Heine, H., "The Parallel Redundancy Protocol for industrial IP networks," Industrial Technology (ICIT), 2013 IEEE International Conference on , vol., No., pp. 1404,1409, Feb. 25-28, 2013.*

"Industrial communication networks—High availability automation networks"—Part 3: Parallel Redundancy Protocol (PRP) and High Availability Seamless Redundancy (HSR), IEC 62439-3 (2012).

Hubert Kirrmann, Special Report IEC 61850—ABB, Seamless redundancy Bumpless Ethernet redundancy for substations with IEC 61850-.

(Continued)

*Primary Examiner* — Siming Liu
(74) *Attorney, Agent, or Firm* — Taft Stettinius & Hollister LLP; J. Bruce Schelkopf

(57) ABSTRACT

A parallel redundancy protocol (PRP) frame is generated at a first electronic device for transmission to a second electronic device over a LAN and a WAN. The PRP frame includes a source MAC address field, packet data, and a redundancy control trailer (RCT). The RCT is compliant with IEC standard 62439-3 and includes a sequence number field, a LAN identifier field, and a frame size field. The source MAC address of the first electronic device and at least one of a sequence number, a LAN identifier and a frame size for the RCT fields of the PRP frame are encoded, and the encoded data is inserted in at least one of the RCT fields of the PRP frame in place of the sequence number, LAN identifier and/or frame size. The PRP frame is transmitted to the second electronic device with the encoded data in the RCT.

25 Claims, 8 Drawing Sheets

(56) References Cited

PUBLICATIONS

Rentschler, M.; Heine, H., "The Parallel Redundancy Protocol for industrial IP networks," Industrial Technology (ICIT), 2013 IEEE International Conference on , vol., No., pp. 1404, 1409, Feb. 25-28, 2013.
802.1w—Rapid Reconfiguration of Spanning Tree http://www.ieee802.org/1/pages/802.1w.html.
C. Plummer, RFC 826, "An Ethernet Address Resolution Protocol", Nov. 1982, http://tools.ietf.org/pdf/rfc826.pdf.
Communication networks and systems for power utility automation—Part 9-2: Specific communication service mapping (SCSM)—Sampled values over ISO/IEC 8802-3, IEC 61850-9-2 (Edition 2.0 Sep. 2011). 1 pg.

\* cited by examiner

PARALLEL REDUNDANCY PROTOCOL OVER WIDE AREA NETWORKS

CROSS-REFERENCE TO RELATED APPLICATION

The present application claims the benefit of the filing date of U.S. Provisional Application Ser. No. 62/273,949 filed on Dec. 31, 2015, which is incorporated herein by reference in its entirety.

TECHNICAL FIELD

The instant application relates to the parallel redundancy protocol, and more particularly to implementing the parallel redundancy protocol over wide area networks.

BACKGROUND

Automated power generation, transmission and distribution systems rely on various types of communication, e.g., control data exchanged between substations and a remote control center, protection data shared within the bay level, sample data sent from CTs/VTs (current transformers/voltage transformers) to intelligent electronic devices, control commands sent from intelligent electronic devices to switch gear, etc. An intelligent electronic device is a microprocessor-based controller of power system equipment, such as circuit breakers, transformers, capacitor banks, etc. Intelligent electronic devices receive data from sensors and power equipment, and can issue control commands, such as tripping circuit breakers if they sense voltage, current, or frequency anomalies, or raise/lower voltage levels in order to maintain the desired level. Common types of intelligent electronic devices include protective relaying devices, on load tap changer controllers, circuit breaker controllers, capacitor bank switches, recloser controllers, voltage regulators, etc. Some local communication, e.g., sensors reporting voltage and current sample values to an intelligent electronic device(s) in the same substation, goose messages exchanged between intelligent electronic devices, etc. are limited within the LANs (local area networks). Other communication, e.g., control and protection data exchanges between the intelligent electronic devices and the supervisory control and data acquisition (SCADA) system or centralized protection and control (CPC) system, often travels through WANs (wide area networks).

To fulfill stringent reliability requirements of communication while maintaining interoperability of intelligent electronic devices in substation automation systems (SASs), International Electrotechnical Commission (IEC) standard 62439-3 defines two redundancy protocols: Parallel Redundancy Protocol (PRP) (IEC 62439-3 Clause 4) and High-availability Seamless Redundancy (HSR) (IEC 62439-3 Clause 5). Both redundancy protocols can overcome failure of a link or a switch in a network with zero switchover time, while enabling clock synchronization according to IEEE 1588 (v2).

Both redundancy protocols employ different approaches and infrastructures. PRP duplicates the data frames to be transmitted, adds a redundancy control trailer (RCT) with a unique sequence number to the end each of a standard data packet such as an IP (Internet protocol) data packet for each PRP frame, and sends both PRP frames through two independent LANs having a similar-topology (IST-LANs). The receiver identifies the frames by the RCT and source MAC (media access control) address, accepts and processes the first-arrived PRP frame, and discards the second PRP frame if it ever arrives. Since the RCT is added at the end of standard data packet as part of the PRP frame, the RCT can be ignored by non-PRP compatible equipment. This approach ensures that PRP works with both PRP compatible and non-compatible equipment as long as the transmitter and receiver ends are PRP compatible.

Similarly, HSR duplicates a data frame and sends both data frames in opposite directions through a ring-topology local area network (RT-LAN). On the ring, each device incorporates a switch element that decides whether to forward or discard the frames from one port to the other. However, instead of adding redundancy information at the tail of the frame as is done in PRP, HSR inserts a header between the MAC header and payload of the data frame. Consequently, HSR-tagged data frames can be processed only by HSR-compatible network equipment, and dropped as bad frames by HSR non-compatible equipment.

HSR and PRP are designed for and benefit only communication within LANs since the source MAC address of the respective frames, used with a sequence number (assigned by HSR/PRP) as a unique doublet to make forward/discard decisions, will lose its uniqueness and be replaced by the MAC address of a different entity (e.g. router or layer-3 switch) when transferred from a LAN to a WAN (wide area network). Consequently, even though redundancy protocols can be enabled within a LAN at both ends in accordance with IEC 62439-3, communication through WANs could experience a long recovery time if LANs are connected to WANs with redundant routers, or even suffer single point failure if each LAN is connected to a WAN with a single router.

Therefore, there is a need to adapt LAN redundancy protocols, especially PRP, to support WAN communication with existing network structure.

SUMMARY

According to an embodiment of a method of implementing parallel redundancy, the method comprises: generating a first parallel redundancy protocol (PRP) frame at a first electronic device for transmission to a second electronic device over a first local area network (LAN) and a wide area network (WAN), the first PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field; encoding e.g. by XORing a source MAC address of the first electronic device and at least one of a sequence number, a LAN identifier and a frame size for the RCT fields of the first PRP frame into encoded data; inserting the encoded data in at least one of the RCT fields of the first PRP frame in place of at least one of the sequence number, the LAN identifier and the frame size; and transmitting the first PRP frame with the encoded data in the RCT to the second electronic device.

According to an embodiment of an electronic device in a power generation, transmission or distribution system, the electronic device comprises a processing circuit operable to: generate a first parallel redundancy protocol (PRP) frame for transmission to a remote device over a first local area network (LAN) and a wide area network (WAN), the first PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field; encode e.g. by XORing a source MAC address of the electronic device and at least one of a sequence number, a LAN identifier and a frame size for the RCT fields of the first PRP frame into encoded data; and insert the encoded data in at least one of the RCT fields of the first PRP frame in place of at least one of the sequence number, the LAN identifier and the frame size. The electronic device also comprises transmit circuitry operable to transmit the first PRP frame with the encoded data in the RCT to the remote electronic device.

According to an embodiment of a method of processing a parallel redundancy protocol (PRP) frame transmitted over a wide area network (WAN) and received at a remote electronic device that does not belong to a local area network (LAN) from which the PRP frame originated, the method comprises: receiving the PRP frame at the remote electronic device, the PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field, wherein the source MAC address field contains a different source MAC address than that of an originating device of the PRP frame, and wherein encoded data is inserted in at least one of the RCT fields of the PRP frame in place of at least one of a sequence number, a LAN identifier and a frame size for the PRP frame; determining that the PRP frame was transmitted over a WAN; in response to determining that the PRP frame was transmitted over a WAN, decoding e.g. by XORing the encoded data contained in the RCT with each MAC address included in a list of MAC addresses accessible by the remote device until a valid LAN identifier is produced by the decoding or the end of the list is reached; and setting an error indicator if a valid LAN identifier is not produced by the decoding.

According to an embodiment of a system for interfacing with electronic devices included in a local area network (LAN) that does not include the system, the system comprises receive circuitry operable to receive a parallel redundancy protocol (PRP) frame transmitted over a wide area network (WAN). The PRP frame comprises a source media access control (MAC) address field, packet data, and a redundancy control trailer (RCT). The RCT is compliant with International Electrotechnical Commission (IEC) standard 62439-3 and includes a sequence number field, a LAN identifier field, and a frame size field. The source MAC address field contains a different source MAC address than that of an originating device of the PRP frame, and encoded data is inserted in at least one of the RCT fields of the PRP frame in place of at least one of a sequence number, a LAN identifier and a frame size for the PRP frame. The system also comprises processing circuit operable to: determine that the PRP frame was transmitted over a WAN; in response to determining that the PRP frame was transmitted over a WAN, decode e.g. by XORing the encoded data contained in the RCT with each MAC address included in a list of MAC addresses accessible by the remote device until a valid LAN identifier is produced by the decoding or the end of the list is reached; and set an error indicator if a valid LAN identifier is not produced by the decoding.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

The embodiments described herein implement PRP over WANs with no added overhead to the PRP frame, and while retaining full compatibility with the PRP standard. According to these embodiments, the MAC address of an originating device is retained even though the PRP frame generated by the device is transmitted over a WAN. Typically this would result in the identity of the originating device being lost. However, according to the embodiments described herein, the source MAC address of the originating device and RCT information related to the PRP frame are encoded. The encoding process ensures that the resulting encoded data fits within the RCT without the suffix or length of the RCT being changed. The encoded data is inserted in at least one of the RCT fields of the PRP frame in place of the information normally placed in these field(s). The PRP frame is then transmitted to the target electronic device over a WAN with the encoded data in the RCT. The end recipient recovers the original RCT information by decoding the encoded data inserted in the RCT, and identifying a valid LAN identifier and a source MAC address from the decoding results. Accordingly, PRP is adapted to support WAN communication with existing network structure.

Figure 1:
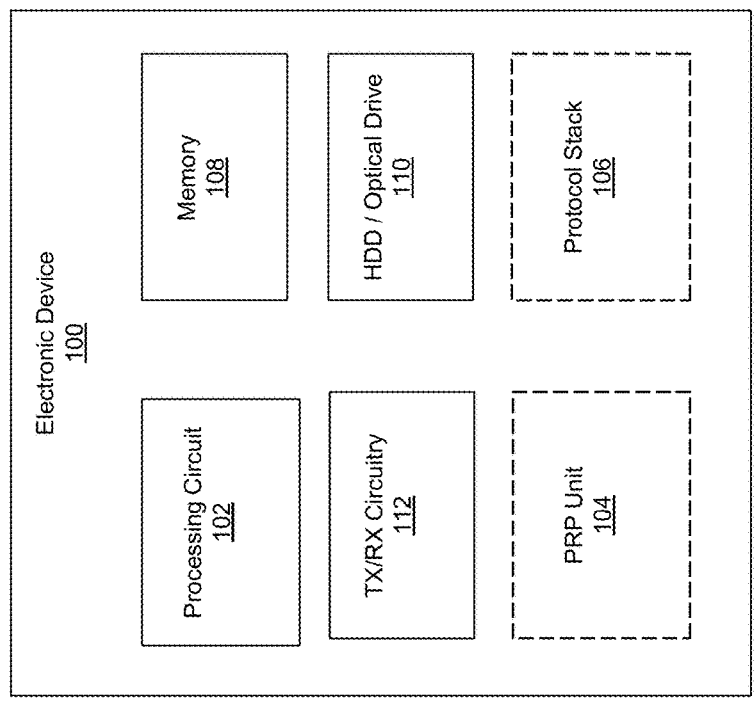
FIG. 1 illustrates a block diagram of an embodiment of an electronic device for implementing the parallel redundancy protocol over wide area networks.

FIG. 1 illustrates an embodiment of an electronic device 100 for use in a power generation, transmission or distribution system or other type of system that employs the PRP standard. In one embodiment, the electronic device is an intelligent electronic device included in a power generation, transmission or distribution system. The intelligent electronic device communicates with a remote supervisory control and data acquisition (SCADA) system or a centralized protection and control (CPC) system that interfaces with the power generation, transmission or distribution system. Packet data transmitted from the intelligent electronic device to the SCADA/CPC system includes data measured, processed and/or received by the intelligent electronic device.

In general, the electronic device 100 includes a processing circuit 102 which can include digital and/or analog circuitry, such as one or more controllers, processors, ASICs (application-specific integrated circuits), etc. for executing program code which implements the functionality of the electronic device, including the PRP-related functions described herein. To this end, the processing circuit 102 includes or is associated with a PRP unit 104 for constructing PRP frames and implementing PRP-related functions, and a protocol stack 106 for implementing different layers of packet-based communication at the electronic device 100. As such, the boxes for elements 104 and 106 in FIG. 1 are illustrated with dashed boxes. In one case, the protocol stack 106 can implement HTTP (hypertext transfer protocol) at the application layer, TCP (transmission control protocol) at the transport layer, IP (Internet protocol) at the Internet/network layer, Ethernet at the data link/link layer, and IEEE 802.3u (wired) or IEEE 802.11 (wireless) standard at the physical layer. These protocol layer examples should be considered non-limiting and are merely illustrative of the types of communication protocols which can be implemented by the protocol stack 106.

The electronic device 100 also includes volatile and/or nonvolatile memory 108, such as DRAM (dynamic random access memory), FLASH, etc., and an HDD (hard disk drive) and/or optical drive 110 for storing program code and related data processed and accessed by the processing circuit 102 during execution of the program code. The electronic device 100 also has transmit and receive (TX/RX) circuitry 112 for transmitting data packets constructed by the PRP unit 104 in conjunction with the protocol stack 106, and for receiving data packets for processing by the PRP unit 104 and the protocol stack 106.

Figure 2:
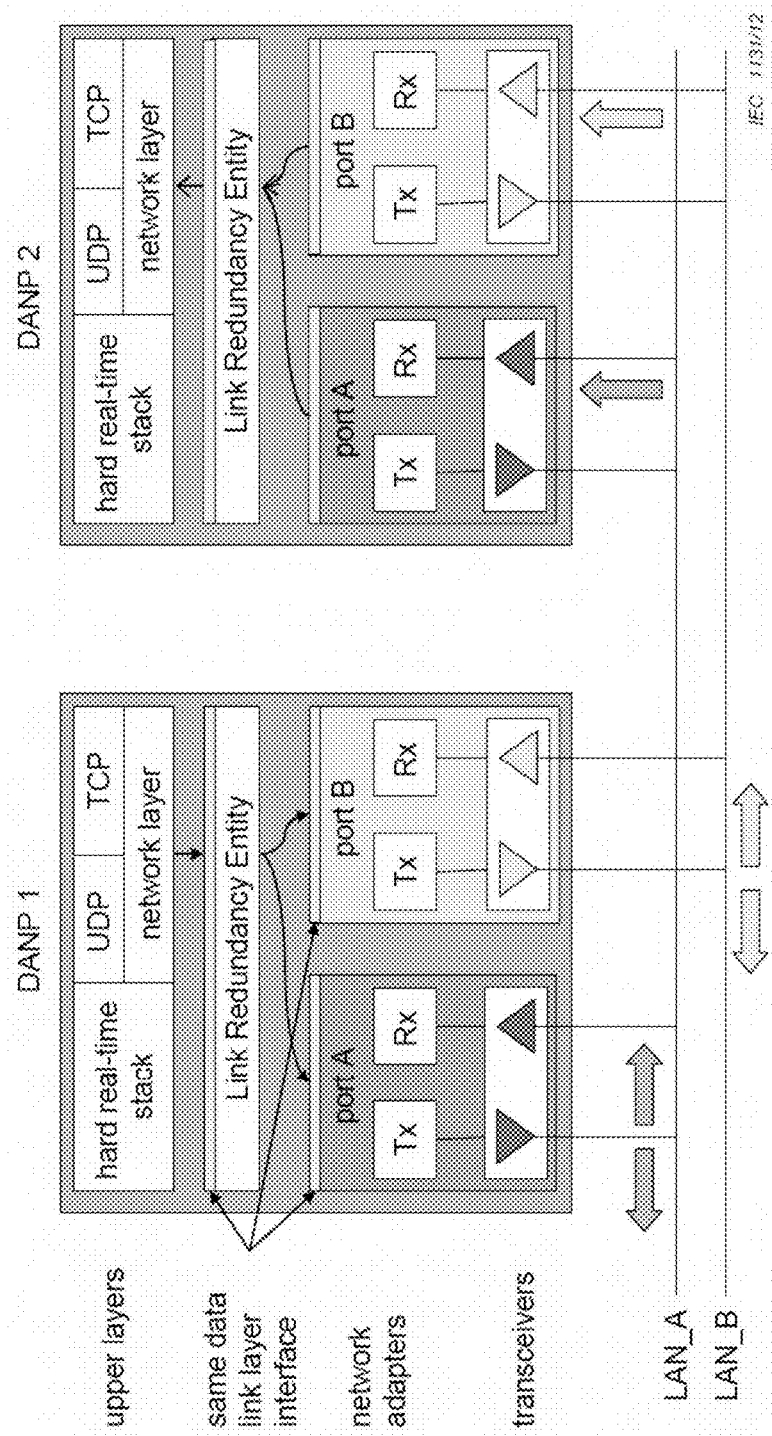
FIG. 2 illustrates in more detail certain components of the electronic device shown in FIG. 1.
Figure 3:
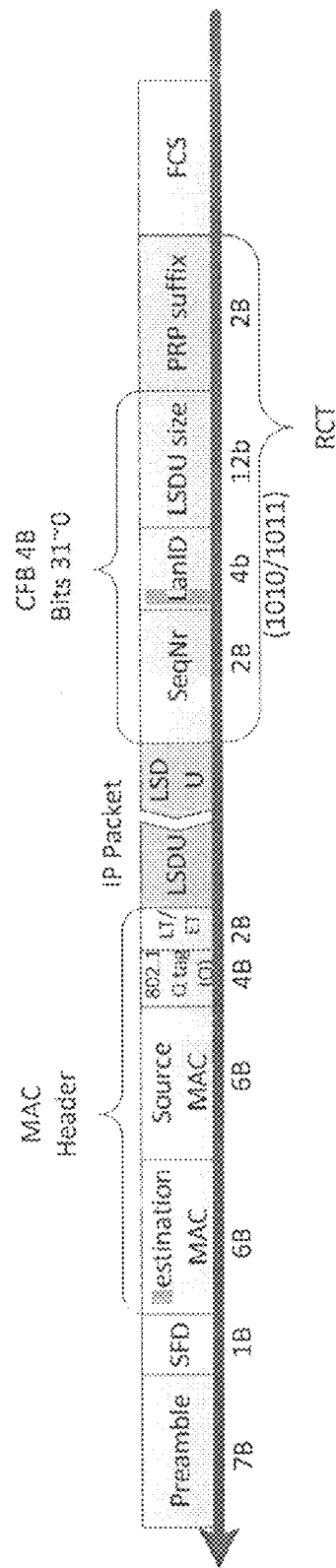
FIG. 3 illustrates a block diagram of an exemplary PRP frame with RCT.
Figure 4:
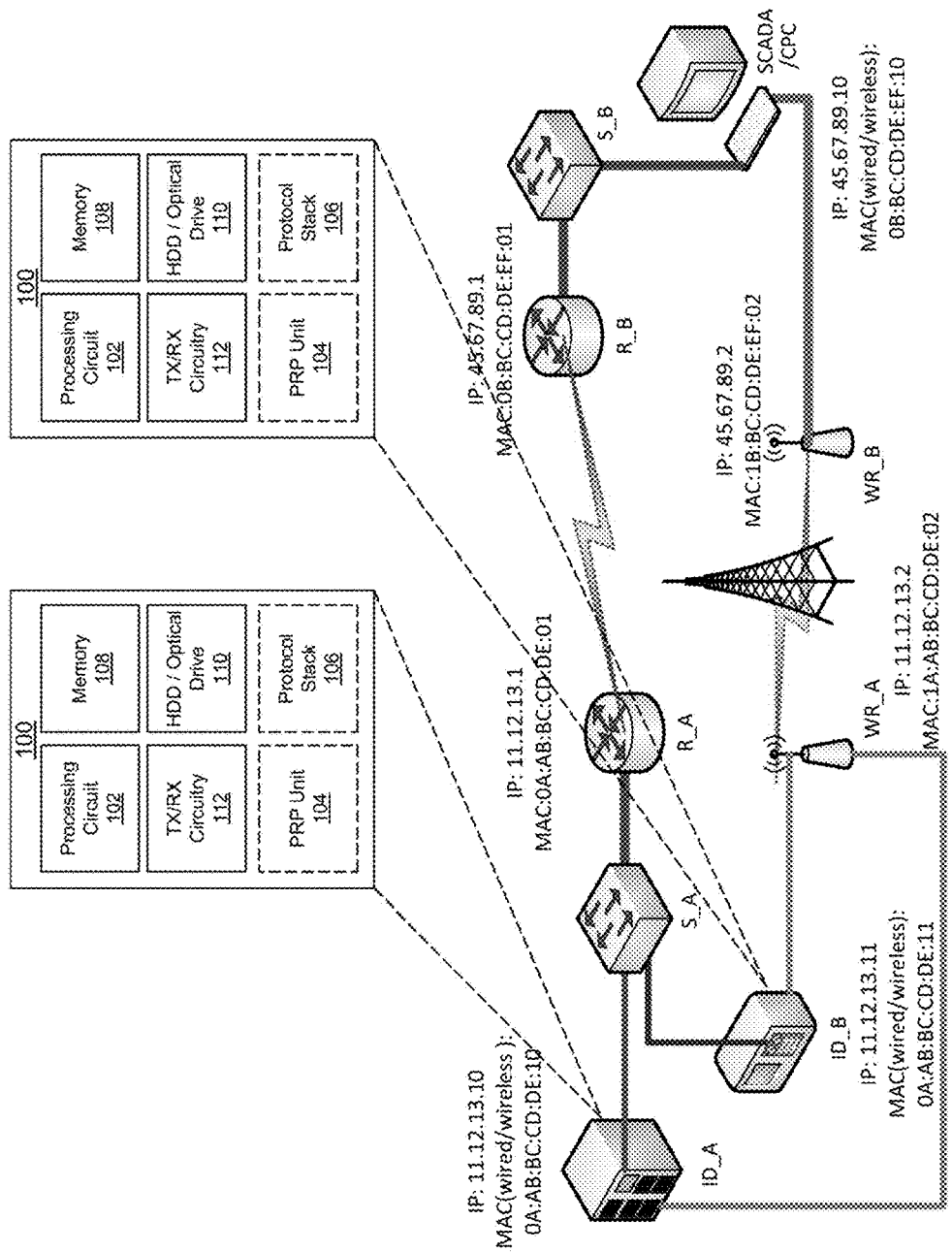
FIG. 4 illustrates a block diagram of an embodiment of a network including LANs and WANs and over which the parallel redundancy protocol is implemented.

FIG. 2 illustrates in more detail the components of the PRP unit 104 and the protocol stack 106 included in or associated with the processing circuit 102 and the TX/RX circuitry 112 which implement the PRP-related functions described herein, as they pertain to the communication stack of the link redundancy entity (LRE) from IEC standard 62439-3 (ed2.0), FIG. 4, page 13. As described in IEC 62439-3, to achieve redundancy, PRP-compatible nodes are connected to two independent LANs having similar topology (IST-LANs), e.g. LAN_A and LAN_B in FIG. 2, through two independent physical ports (port A and port B) as doubly attached nodes obeying to PRP (DANP). The physical ports include circuitry such as transmit (TX) and receive (RX) circuitry and transceivers for dealing with the physical connectivity of the corresponding node DANP1/DANP2. Two such PRP-compatible nodes DANP1, DANP2 are shown in FIG. 2, where each pair of ports for the same node share the same MAC address, but operate in parallel and are attached to the same upper layers of the protocol stack 106 e.g. through a link redundancy entity (LRE) embedded in the data link layer. The LRE ensures that the upper layers are unaware of, and unaffected by, the redundancy. The LRE performs two key tasks related to the PRP-related functions described herein, which are explained next in the context of the PRP frame shown in FIG. 3.

Particularly, the LRE handles duplicate PRP frames and manages PRP redundancy. For example, the upper layers of the protocol stack 106 can generate an IP datagram which includes IP packet data (LSDU). After receiving the IP datagram from the upper layers, the data link layer interface attaches a MAC header to the datagram and converts it to a data link layer data frame, as is done in non-redundant networks. The MAC header includes a source MAC address field, a destination MAC address field, and other field such as an 802.1Q tag and an Ethernet type/size field for an Ethernet frame. In the case of an Ethernet frame, the MAC header is preceded by a preamble and start frame delimiter (SFD). Normally the LRE uses the same destination MAC address for the destination within a LAN. However, for a two-router WAN connection, the LRE uses different destination MAC addresses (while the destination IP address should be the same) for the redundant packets. The LRE only needs to assign different MAC addresses (for two different routers) if the packets are designated to travel outside the LAN.

The LRE duplicates the data frame received from the upper layers, and appends a redundancy check trailer (RCT) to each duplicated data frame. The RCT is compliant with IEC standard 62439-3. As such, the RCT includes a sequence number field (SeqNr), a LAN identifier field (LanID), a frame size field (LSDU size) and a PRP suffix which identifies the new (appended) frame as a PRP frame. The PRP frame ends with a frame check sequence (FCS), which is a cyclic redundancy check used to detect in-transit corruption of data. Appending the RCT to a standard data frame as described above could generate oversize frames that exceed the maximum frame size allowed e.g. by IEEE 802.3. To maintain compliance with such a standard, the processing circuit 102 in each node (DAN) using PRP can be configured for a maximum payload size of 1496 octets.

The two RCTs generated by the same node (DAN) are identical except for the LAN IDs to be inserted in the LanID field of the respective RCTs. Returning to the example in FIG. 2, port A of node DANP1 transmits over LAN LAN_A and port B of node DANP1 transmits over LAN LAN_B. The LAN ID for LAN_A is '1010' and '1011 for LAN_B. With this being the only difference between the RCTs, the two redundant PRP frames are sent through the respective physical ports of node DANP1 to LANs LAN_A and LAN_B separately.

The two PRP frames travel through LAN_A and LAN_B with different delays and, ideally, both reach the destination node DANP2. The receiving node DANP2 consumes the first PRP frame and discards the second one (if it arrives). The MAC address of the originating device (DANP1 in the example of FIG. 2) is used to identify the received PRP frame. During the handling of duplicated PRP frames, the sequence number in the RCT combined with the original source MAC address are used as the identifying doublet of the data frame. Since the RCT will be ignored by PRP non-compatible equipment, a standard Ethernet unit is fully functional in the PRP network as a singly attached node (SAN). Absent further processing by the transmitting DAN node, PRP cannot be supported over WANs because the MAC address of the originating node is automatically replaced in the MAC header by a router or layer-3 switch which are used to handle packet processing between LANs and WANs. That is, when data frames are transmitted to WANs, the gateways, usually layer-3 routers or switches, replace the original source MAC address with their own MAC address during the process of routing and forwarding the data frames. Without the MAC address of the device that originated the PRP frame, the target device cannot properly handle duplicate PRP frames as explained next in more detail.

As a LAN-centric protocol, PRP utilizes the MAC address of the originating device, commonly employed by layer-2 protocols, e.g. Rapid Spanning Tree Protocol (RSTP), to identify the source and destination of the data frames. However, when a data frame leaves its original LAN through a router, the original source MAC address is replaced with the MAC address of the router. As such, the MAC address field of the data frame loses its identification role in the context of PRP frames. The IP address in a layer-3 header, rather than the MAC address, takes the role of the identification address and decides the hop-by-hop routing when the data frame reaches a WAN with layer-3 routing protocols, e.g., Address Resolution Protocol (ARP). The MAC address regains its power when the data frame reaches its destination LAN. However, at this moment, the source MAC address of the data frame is the MAC address of the router connecting the destination LAN to the WAN, and the MAC address of the device that originated the data frame is lost in the transmission.

FIG. 4 shows a basic network example, in which two intelligent electronic devices ID_A, ID_B included in a power generation, transmission or distribution system are connected to a WAN through two routers R_A, WR_A and two paths of wired and wireless WANs, respectively. The wired path includes a switch S_A and router R_A. The wireless path includes wireless router WR_A. A supervisory control and data acquisition (SCADA) system and/or a centralized protection and control (CPC) system that interfaces with the power generation, transmission or distribution system also is connected by a wired path through router R_B and a layer-2 switch S_B, and a wireless path through wireless router WR_B. In case of a single router connection, the process is similar. However, such a configuration can lead to single point failures and therefore is not preferred and not elaborated on. In either case, packet data transmitted by either intelligent electronic device to the SCADA/CPC system includes data measured, processed and/or received by that intelligent electronic device as is well known in the power generation, transmission and distribution arts.

In a first exemplary WAN transmission scenario, the IP address and MAC address for both ports of ID_A are identical, e.g., the IP address=11.12.13.10 and the MAC address=0A:AB:BC:CD:DE:10 as shown in FIG. 4. ID_A attempts to send packet data to the SCADA/CPC system via a pair of duplicated PRP frames with the sequence number n via the following steps. First, ID_A determines that the SCADA/CPC system is on a different LAN (45.67.89.1) based on its IP address (11.12.13.10) and subnet mask (255.255.255.0). For the wired transmission path, ID_A sends an ARP request to learn the MAC address of its default gateway, e.g., router R_A. ID_A sends one of the duplicate PRP frames to R_A with its own wired MAC address (0A:AB:BC:CD:DE:10) as the source MAC address and the MAC address of R_A (0A:AB:BC:CD:DE:01) as the destination MAC address. Switch S_A passes the PRP frame without modifying the MAC addresses, and the PRP frame is routed from router R_A to R_B. If router R_B receives the PRP frame, R_B sends the PRP frame to the SCADA/CPC system with the MAC address of router R_B (0B:BC:CD:DE:EF:01) as the source MAC address and the MAC address of the SCADA/CPC system (0B:BC:CD:DE:EF:10) as the destination MAC address. The SCADA/CPC system receives the data frame with the identifying PRP doublet, MAC address 0B:BC:CD:DE:EF:01 and sequence number n, and LanID 1010. A similar process happens over the wireless communication path, in which the MAC address of wireless router WR_A is used as the source MAC address in the redundant PRP frame. The SCADA/CPC system receives this PRP frame with PRP doublet, MAC address 1B:BC:CD:DE:EF:02, sequence number n, and LanID 1011. Since both PRP frames have different PRP doublets in this example, both frames are forwarded to the upper layers at the SCADA/CPC system, where the TCP layer discards the later-arriving frame. Such actions compromise the data frame discarding policy of the PRP protocol, and increases data frame processing overhead in the upper layers.

In a second exemplary WAN transmission scenario, both ID_A and ID_B send different data frames to the SCADA/CPC system. ID_A sends two redundant PRP frames to the SCADA/CPC system with sequence number m. These PRP frames are denoted DF_A_LA (data frame from ID_A transmitted via R_A) and DF_A_LB (redundant data frame from ID_A transmitted via WR_A). After a brief period (shorter than $t_{wrapMin}$, the minimum possible time between two repetitions of the same sequence number by legitimate frames after 65536 increments, about 400 ms in a 100 Mbit/s network), ID_B sends two PRP frames with the same sequence number m, denoted as DF_B_LA (transmitted over R_A) and DF_B_LB (transmitted over WR_A). The SCADA/CPC system receives DF_A_LA and DF_B_LA with the same PRP doublet, MAC address 0B:BC:CD:DE:EF:01 and sequence number m. Since DF_A_LA arrives first in this example, according to the PRP discarding policy, DF_A_LA is forwarded to the upper layers at the SCADA/CPC system and DF_B_LA is discarded. Similarly, DF_A_LB is forwarded and DF_B_LB discarded. As a result, both data frames from ID_A are forwarded, whereas both data frames from ID_B are discarded. These two scenarios demonstrate the consequences of employing PRP over WAN. The acceptance of duplicate frames and rejection of legitimate frames are caused by the altered source MAC address during the WAN transmission.

The embodiments described herein retain the MAC address of the originating device even though a PRP frame generated by the device is transmitted over a WAN. The embodiments described herein are fully compatible with IEC standard 62439-3. Moreover, the embodiments described herein are fully compatible with any future PRP standard released by the IEC which is backward-compatible with IEC 62439-3.

Again using FIG. 4 as a non-limiting example, each intelligent electronic device can be implemented as the electronic device 100 shown in FIGS. 1 and 2 and previously described herein. These components, particularly the PRP unit 104 and the protocol stack 106 included in or associated with the processing circuit 102 and the TX/RX circuitry 112, construct and process PRP frames in a way that retains the MAC address of the originating device even though a PRP frame generated by the device is transmitted over a WAN. In one embodiment, the processing circuit 102 generates a PRP frame for transmission to a remote device over a LAN and WAN. The PRP frame comprises a source MAC address field, packet data, and an RCT. The RCT is compliant with IEC standard 62439-3, and includes a sequence number field, a LAN identifier field, and a frame size field. The actual PRP frame can be a normal MAC frame plus a RCT, and therefore has other parts such a, destination MAC address, 802.1Q tag, etc. The processing circuit 102 encodes the source MAC address of the originating device (e.g. ID_A or ID_B in FIG. 4) and at least one of the sequence number, LAN identifier and frame size for the RCT fields of the PRP frame into encoded data.

Figure 5:
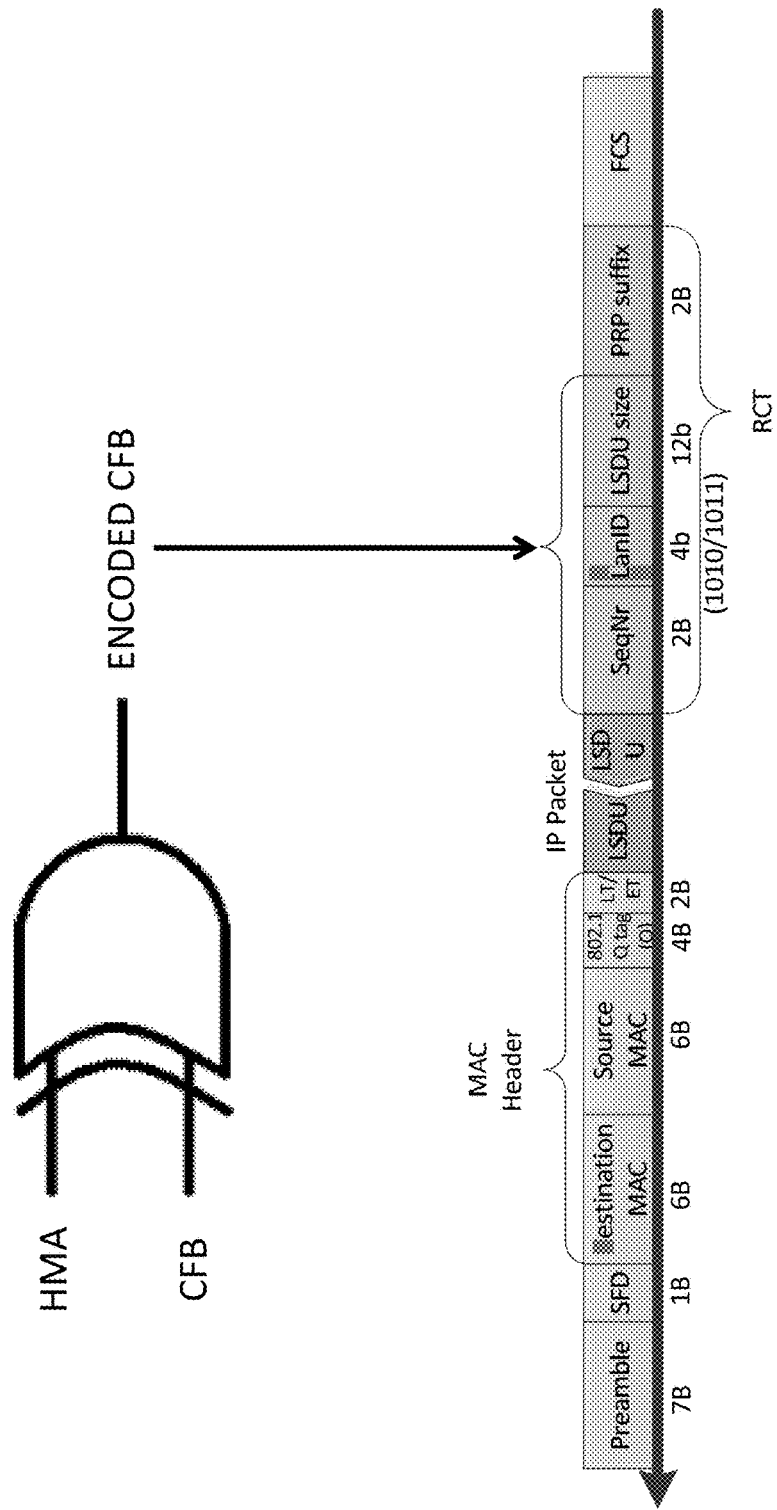
FIG. 5 illustrates a block diagram of an embodiment of inserting encoded data in one or more RCT fields of a PRP frame.

FIG. 5 illustrates one embodiment in which the processing circuit 102 performs the encoding by translating the source MAC address of the originating device from an M-byte initial MAC address value to an N-byte hashed MAC address value (HMA) using a hashing function, wherein M and N are integers and M>N. The processing circuit 102 then performs an exclusive-OR operation (also referred to as XOR or XORing herein) on the N-byte hashed MAC address value and at least one of the sequence number, the LAN identifier and the frame size to produce the encoded data. In one embodiment, M=6, N=4, the entire CFB is XORed with the HMA, and the encoded data (ENCODED CFB) occupies all RCT fields of the PRP frame in place of the sequence number, LAN identifier and frame size for that PRP frame. In other embodiments, the encoded data occupies fewer bytes e.g. just the LanID field (4 bits) and/or SeqNr field (2 bytes) of the RCT.

The size of the encoded data is determined to ensure that MAC address uniqueness is maintained for all possible originating devices in the LAN of interest. In an extreme example, a LAN with 3 or fewer originating devices requires only 2 bits of encoded data to ensure MAC uniqueness. In general, the length of the encoded data can be predetermined e.g. set to the length of the RCT CFB (characteristic four bytes) i.e. the combined length of the SeqNr, LanID and LSDU fields, or set to a shorter length e.g. the length of the LanID field (4 bits) and/or SeqNr field (2 bytes) of the RCT. Alternatively, the length of the hash function used by the processing circuit 102 to generate the encoded data can be determined based on the number of electronic devices included in the LAN of interest, so that N can vary and corresponds to the number of electronic devices included in the LAN. In each case, the PRP suffix field which identifies the data frame as a PRP frame is not altered.

Figure 6:
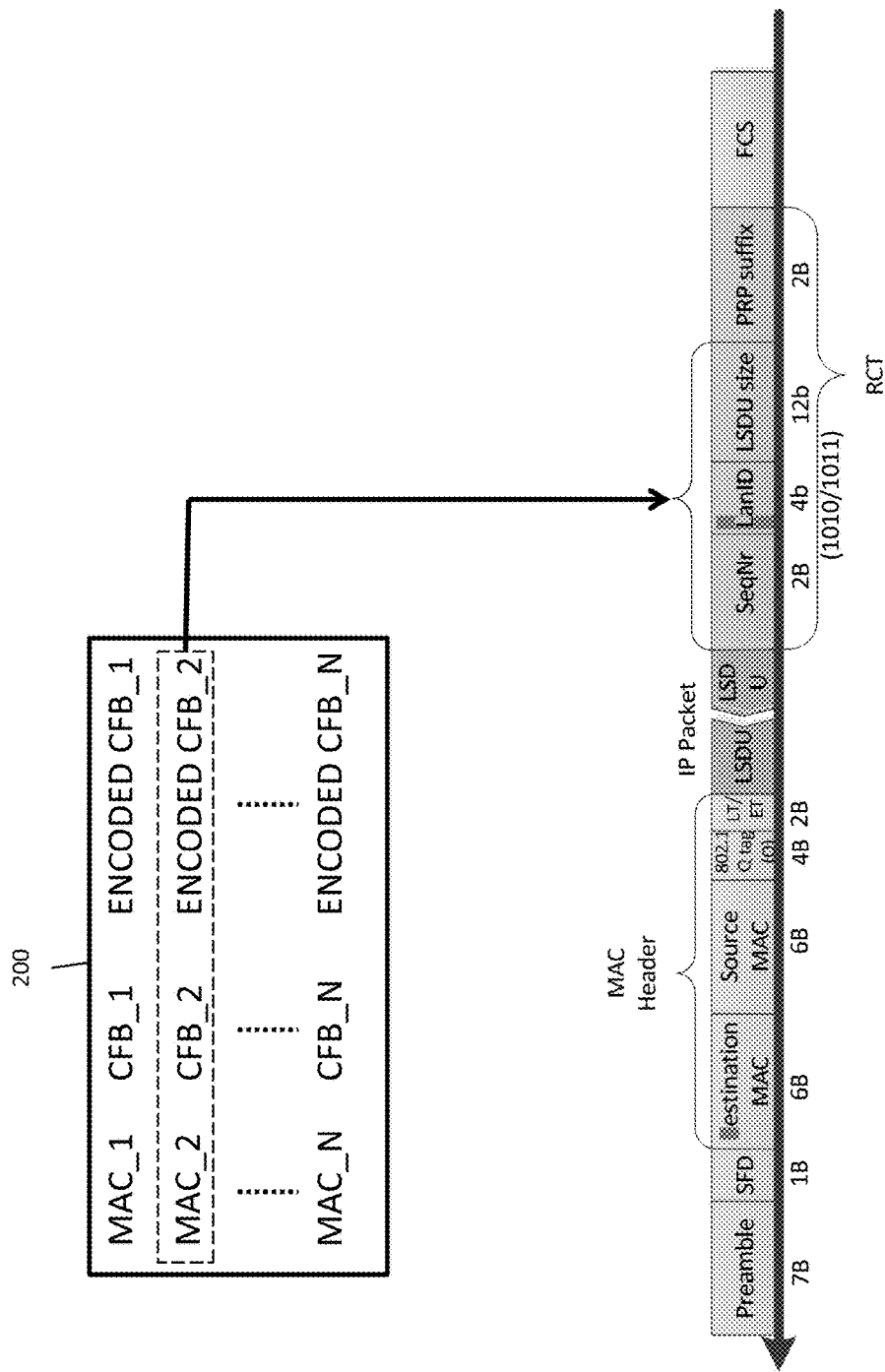
FIG. 6 illustrates a block diagram of another embodiment of inserting encoded data in one or more RCT fields of a PRP frame.

FIG. 6 illustrates another embodiment in which the processing circuit 102 performs the encoding by accessing a lookup table 200 which associates source MAC addresses (MAC_X), CFB information (CFB_X) such as sequence numbers, LAN identifiers and/or frame sizes to different encoded data values (ENCODED CFB_X). The processing circuit 102 selects the encoded data value associated with the source MAC address of the originating device, and the sequence number, LAN identifier and frame size for the RCT fields of the PRP frame to be transmitted. Any other standard encoding schemes can be employed to encode the MAC address and RCT information.

In each case, the processing circuit 102 inserts the encoded data in at least one of the RCT fields of the PRP frame to be transmitted, in place of at least one of the sequence number, LAN identifier and frame size for that PRP frame. For example if the encoded data occupies the entire length of the CFB, then the processing circuit 102 inserts the encoded data in all three CFB fields of the RCT. If the encoded data occupies only part of the CFB, then the processing circuit 102 inserts the encoded data in those CFB field(s) whose information is being replaced by the encoded data. In each case, the transmit circuitry 112 of the originating device 100 transmits the PRP frame with the encoded data in the RCT to a remote electronic device such as the SCADA/CPC system shown in FIG. 4 over its LAN and one or more WANs.

On the receive side, the target device receives the PRP frame. The source MAC address field of the received PRP frame contains a different source MAC address than that of the originating device of the PRP frame. Returning to the network example illustrated in FIG. 4, the source MAC address is that of router R_B (0B:BC:CD:DE:EF:01) if the frame was transmitted through LAN A or that of router WR_B (1B:BC:CD:DE:EF:02) if transmitted through LAN B. Encoded data is inserted in at least one of the RCT fields of the received PRP frame in place of at least one of the sequence number, LAN identifier and frame size for the PRP frame. The SCADA/CPC system, which includes PRP and protocol stack units similar those included in the originating device 100, determines that the PRP frame was transmitted over a WAN. In one embodiment, the SCADA/CPC system determines that the RCT of the PRP frame contains at least one of an invalid sequence number, an invalid LAN identifier and an invalid frame size. An invalid sequence number (SeqNr) can be difficult to identify. For example, packets may be lost through the WAN and the sequence of arriving packets is not guaranteed through the WAN. Frame size (LSDU size) and LAN identifier (LanID) are easier to use for detecting RCT validity. In any case, a combination of seqNr with LanID and/or LSDU size or part of these fields can be used to test RCT validity.

The SCADA/CPC system can determine that the PRP frame was transmitted over a WAN in other ways. For example, the source MAC of the PRP frame is from a router and therefore indicative that the PRP frame transferred from a WAN. The SCADA/CPC system also can be privy to hints such as an invalid LAN identifier and/or invalid load size which suggest that the PRP frame was transmitted over a WAN. Such hints may correspond to bit errors introduced by the network, especially in wireless environments. These invalidations can indicate whether a PRP frame traversed a WAN. Such PRP frames are not discarded. Instead they are forwarded to the upper layers and the error count is increase as previously described herein.

In response, the SCADA/CPC system decodes e.g. by XORing the encoded data contained in the RCT with each MAC address included in a list of MAC addresses accessible by SCADA/CPC system until a valid LAN identifier is produced by the decoding process or the end of the list is reached. The SCADA/CPC system sets an error indicator e.g. by incrementing an error counter if a valid LAN identifier is not produced by the decoding process.

Figure 7:
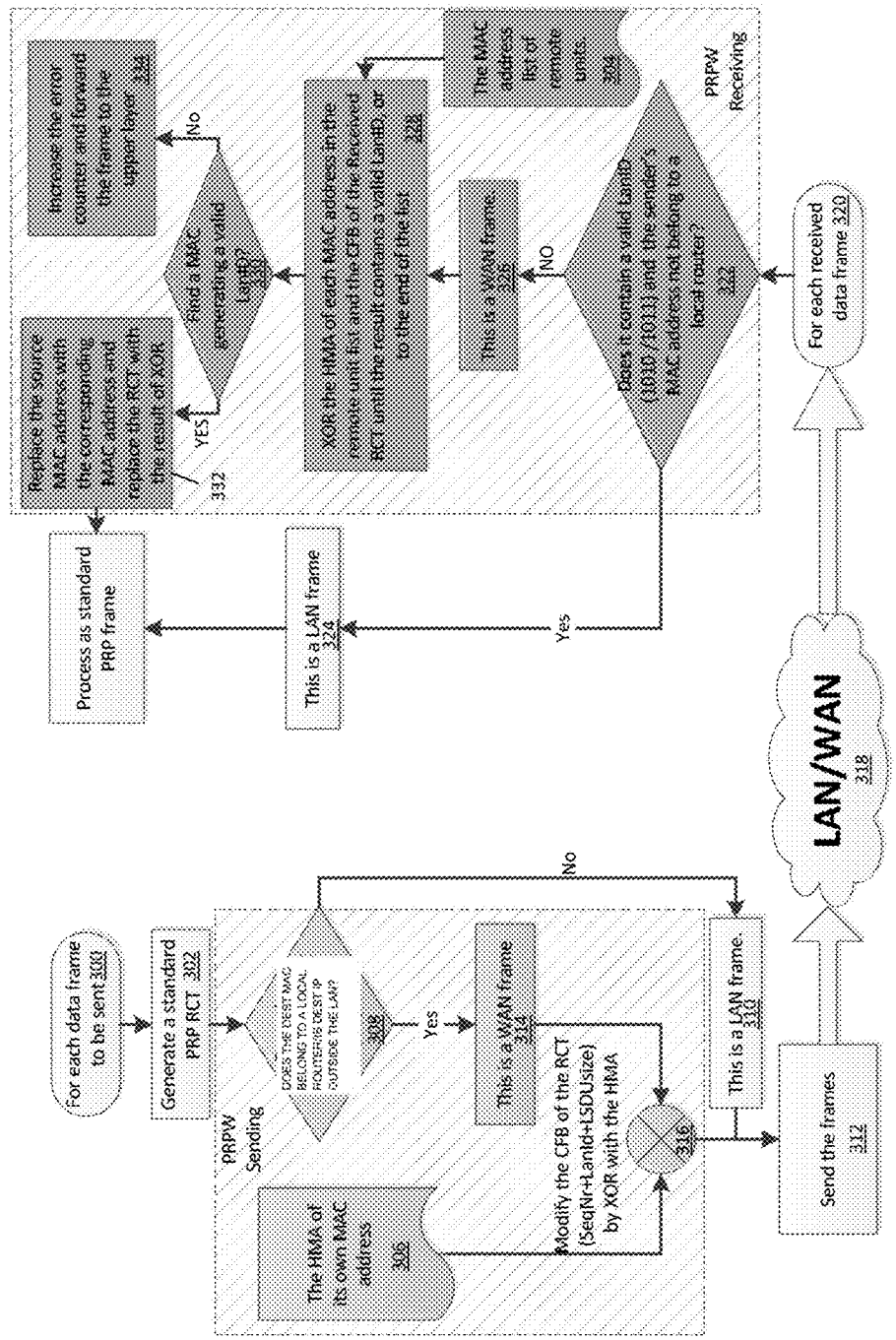
FIG. 7 illustrates a block diagram of an embodiment of a flow diagram for implementing the parallel redundancy protocol over a wide area network.

FIG. 7 illustrates a flow chart of an embodiment of extending the PRP to WAN, while retaining the MAC address of the originating device. Each originating device is a doubly attached node obeying to PRP (DANP). For each data frame to be sent by a DANP (Block 300), a standard PRP RCT is generated which is compliant with IEC standard 62439-3 (Block 302). The data frame will be transmitted to a target device over a LAN and one or more WANs. The target device is provided a MAC address list of remote DANPs (Block 304), where 'remote' means outside the current LAN of the target device. The MAC address list can be created manually during an initialization process and updated when necessary, e.g., when new remote DANPs are connected or existing DANPs are replaced. In one embodiment, the MAC addresses are calculated with a hash function, which translates the 6-byte MAC address to a 4-byte Hashed-MAC address (HMA) as previously described herein (Block 306). Any standard encoding technique can be used which translates the M-byte MAC address to an N-byte Hashed-MAC address (HMA) wherein M and N are integers and M>N.

To avoid accidentally generating a valid local LanID for remote receivers, the hash function is selected so as to not generate a HMA with the corresponding bits to the LanID (bits 15~12) as "0000" or "0001" as shown Table 1. If the hash function does not limit its output, the remote receiver can check if the source MAC address of the received data frame belong to one of its local routers' to decide whether the data frame is from its local LAN or from a WAN.

TABLE 1

Combinations of HMA bits 15-12 that retain valid LanID with XOR operation

| Hashed MAC Address (HMA) | LanID | HMA XOR LanID |
|---|---|---|
| 0000 | 1010 | 1010 |
| 0001 | | 1011 |

TABLE 1-continued

Combinations of HMA bits 15-12 that
retain valid LanID with XOR operation

| Hashed MAC Address (HMA) | LanID | HMA XOR LanID |
|---|---|---|
| 0001 | 1011 | 1010 |
| 0000 | | 1011 |

Before the DANP sends the data frame, the DANP checks whether the destination MAC address belongs to its local router e.g. router R_A or WR_A in FIG. 4 and/or if the destination IP is outside the LAN (Block 308). The MAC address of the local router can be obtained and updated with ARP protocol. If the destination MAC address does not belong to the local router for the DANP, then the target device is within the current LAN of the DANP (Block 310), and the DANP sends two duplicate PRP data frames directly without inserting any encoded data in the RCT of the duplicate PRP frames (Block 312). The duplicate PRP frames carry the same packet data and source MAC address. The LAN identifier contained in the LanID field of each duplicate PRP frame is different, to indicate that the PRP frames are transmitted over two different LANs (e.g. LAN A and LAN B in FIG. 4).

However, if the destination MAC address belongs to the local router for the DANP, the target device does not belong to the same LAN as the DANP. The data frame therefore will be transmitted outside the local LAN and over one or more WANs to the target device (Block 314). As such, the DANP modifies the first 4 bytes of the RCT (SeqNr+LanId+LSDUsize) i.e. the CFB by XORing the CFB with the HMA of the DANP (Block 316). The transmit circuitry 112 then sends the modified PRP frames through its two physical ports over a LAN and WAN (Blocks 312, 318).

For each received data frame (Block 320), the target device e.g. a SCADA or CPC system in a power generation, transmission or distribution system determines whether the PRP frame is transmitted from a WAN e.g. by checking whether the RCT contains a valid LanID, which should be either 1010 or 1011 according to the PRP standard (Block 322). If a valid LanID is found, the originating device identifies the received frame as a local PRP frame from the originating device and is treated with standard PRP processing (Blocks 322, 324). Otherwise, the target device identifies the received frame as a PRPW frame i.e. a PRP frame transmitted over a WAN (Block 326).

For a PRPW frame, the target device decodes e.g. XORs the CFB with each MAC address in the MAC address list of remote units i.e. remote DANPs, until a valid LanID is generated or to the end of the list (Blocks 304, 328). If a valid LanID is generated by the decoding process (Block 330), the RCT of the received data frame can be replaced with the result of the decoding operation, and the source MAC address also can be replaced with the corresponding MAC address in the MAC address list i.e. the source MAC address of the originating device (Block 332). The modified frame is processed, e.g., forwarded to the upper layers or discarded, as a standard PRP frame. Instead of replacing the MAC address of the router with the MAC address of the originating DANP, the PRPW protocol at the receiving device can use the MAC address of the originating DANP to make its own decision of forwarding or discarding, and retain the MAC address of the router for other protocols. The example just described involves the case where the encoding includes the LanID field. If the LanID field is not included in the encoding, the encoding process is modified accordingly.

If none of the HMAs in the MAC address list generates a valid LanID during the decoding e.g. XORing process (Block 330), the received data frame can be forwarded to the upper layers with an increment in the error counter (Block 334). The error which caused the invalid LanID could be a configuration error either on the sender or receiver side, e.g. a missing MAC address in the MAC address list, the payload of the data frame can still be valid. As such, even data frames with invalid LanIDs can still be forwarded to the upper layers for future decision. Because these types of configuration errors are permanent, they can be detected rapidly by monitoring the error counter. Moreover, since a spoof attacker may not have the MAC address list of the remote units i.e. the DANPs, the spoof attack could also be detected efficiently with the same manner.

Figure 8:
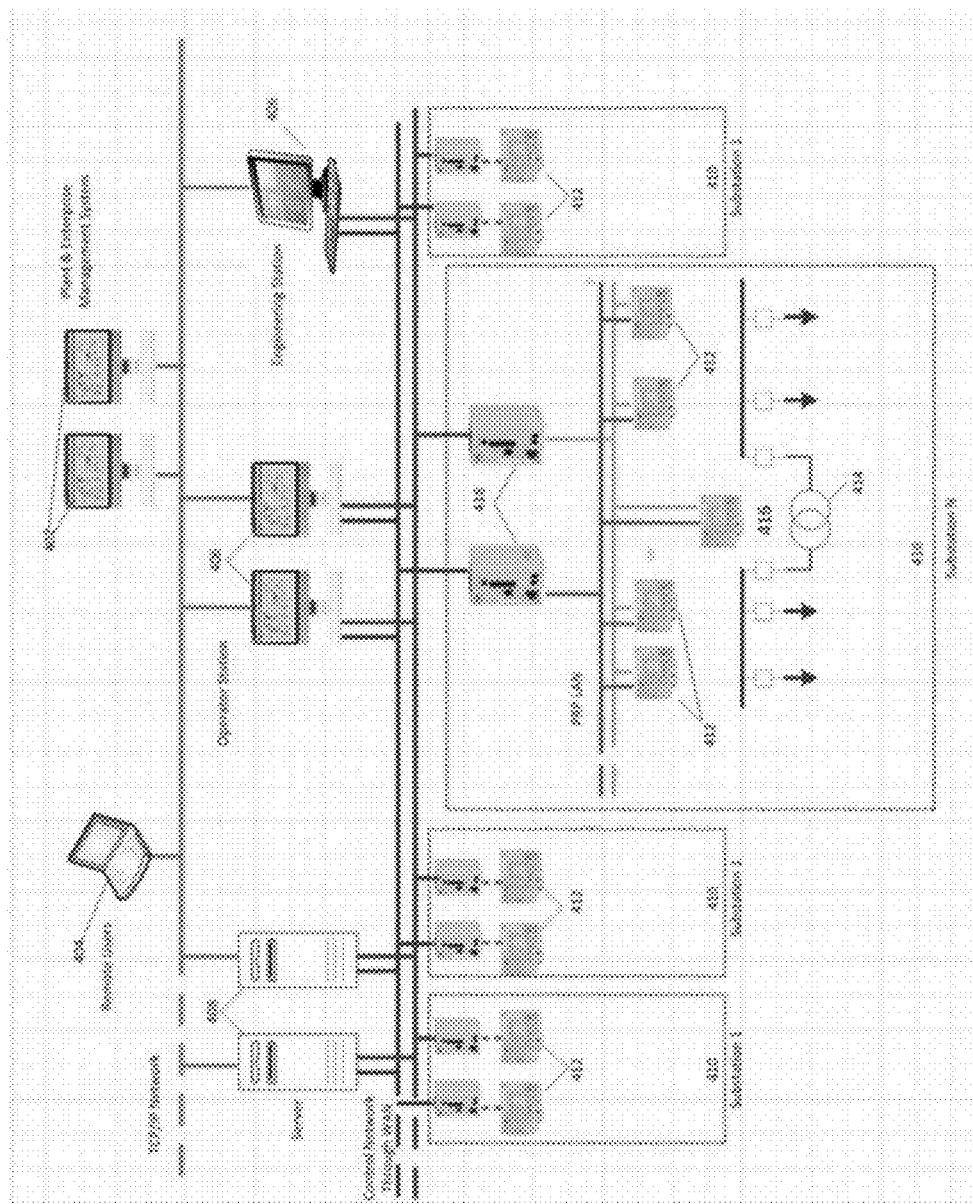
FIG. 8 illustrates a block diagram of an embodiment of a power generation, transmission or distribution system which implements the parallel redundancy protocol over a WAN.

FIG. 8 illustrates an embodiment of a power generation, transmission or distribution system 400 which includes plant and enterprise management systems 402 and remote users 404 interfaced with various operator and engineering stations 406 and servers 408 of the power generation/transmission/distribution system via a communication network such as a TCP/IP network. The operator and engineering stations 406 and servers 408 are also interfaced to substations 410 of the power generation/transmission/distribution system 400 over a control network. Each substation 410 includes a set of equipment for reducing a higher voltage (MV) of electrical power transmission to a lower voltage (LV). Substations typically have switching, protection and control equipment 412, and transformers 414. In a large substation, circuit breakers are used to interrupt short circuits or overload currents that may occur on the network. Smaller distribution stations may use recloser circuit breakers or fuses for protection of distribution circuits. Substations do not usually have generators, although a power plant may have a substation nearby. Other devices such as capacitors and voltage regulators can also be located at a substation. The substations 410 can include intelligent electronic devices 416 for measuring, processing and/or receiving data. Each substation 100 may be part of a LAN, and the LANs can be interfaced to the control network via respective routers 418, level-3 switch, etc., and the data traversing through the intelligent electronic devices 416 is reported outside the respective local LANs over the control and communication networks for analysis and processing.

The intelligent electronic devices 416, plant and enterprise management systems 402, remote users 404, the operator and engineering stations 406, and/or the servers 408 which make up the generation/transmission/distribution system 400 include the PRP and protocol stack functionality previously described herein, and therefore provide seamless redundancy both within the local LANs and outside the LANs for PRP frames which are communicated over one or more WANs such as the control and/or communication networks shown in FIG. 8 and as previously described herein. This way, PRP is extended to WANs while retaining the MAC address of the originating device e.g. the intelligent electronic devices 416 or other intelligent devices included in the substations 410.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of implementing parallel redundancy, the method comprising:
   generating a first parallel redundancy protocol (PRP) frame at a first electronic device for transmission to a second electronic device over a first local area network (LAN) and a wide area network (WAN), the first PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field;
   encoding a source MAC address of the first electronic device and at least one of a sequence number, a LAN identifier and a frame size for the RCT fields of the first PRP frame into encoded data;
   inserting the encoded data in at least one of the RCT fields of the first PRP frame in place of at least one of the sequence number, the LAN identifier and the frame size; and
   transmitting the first PRP frame with the encoded data in the RCT to the second electronic device.

2. The method of claim 1, wherein encoding the source MAC address of the first electronic device and at least one of the sequence number, the LAN identifier and the frame size into the encoded data comprises:
   translating the source MAC address of the first electronic device from an M-byte initial MAC address value to an N-byte hashed MAC address value using a hashing function, wherein M and N are integers and M>N; and
   XORing the N-byte hashed MAC address value and at least one of the sequence number, the LAN identifier and the frame size.

3. The method of claim 2, wherein M=6, N=4 and the encoded data occupies all of the RCT fields of the first PRP frame in place of the sequence number, the LAN identifier and the frame size.

4. The method of claim 2, further comprising:
   modifying a length of the hash function based on a number of electronic devices included in the first LAN, so that N corresponds to the number of electronic devices included in the first LAN.

5. The method of claim 1, wherein encoding the source MAC address of the first electronic device and at least one of the sequence number, the LAN identifier and the frame size into the encoded data comprises:
   accessing a lookup table which associates source MAC addresses, sequence numbers, LAN identifiers and frame sizes to different encoded data values; and
   selecting the encoded data value associated with the source MAC address of the first electronic device, and the sequence number, the LAN identifier and the frame size for the RCT fields of the first PRP frame.

6. The method of claim 1, further comprising:
   verifying that the second electronic device does not belong to the first LAN prior to inserting the encoded data in at least one of the RCT fields of the first PRP frame in place of at least one of the sequence number, the LAN identifier and the frame size.

7. The method of claim 6, wherein verifying that the second electronic device does not belong to the first LAN comprises:
   determining that a destination MAC address included in the first PRP frame identifies a local router associated with the first LAN.

8. The method of claim 1, further comprising:
   generating a second PRP frame at the first electronic device for transmission to the second electronic device over a second LAN different than the first LAN and a WAN, the second PRP frame comprising a source MAC address field, the same packet data as the first PRP frame, and an RCT which is compliant with IEC standard 62439-3 and includes a sequence number field, a LAN identifier field, and a frame size field;
   encoding the source MAC address of the first electronic device and at least one of a sequence number, a LAN identifier and a frame size for the RCT fields of the second PRP frame into encoded data, wherein the LAN identifier for the first PRP packet identifies the first LAN and the LAN identifier for the second PRP packet identifies the second LAN;
   inserting the encoded data for the second PRP frame in at least one of the RCT fields of the second PRP frame in place of at least one of the sequence number, the LAN identifier and the frame size for the second PRP frame; and
   transmitting the second PRP frame with the encoded data in the RCT to the second electronic device.

9. The method of claim 1, further comprising:
   generating a second PRP frame at the first electronic device for transmission to a third electronic device that belongs to the first LAN, the second PRP frame comprising a source MAC address field and an RCT, the RCT being compliant with IEC standard 62439-3 and including a sequence number field, a LAN identifier field, and a frame size field;
   inserting the source MAC address of the first electronic device in the source MAC address field of the second PRP frame;
   inserting a sequence number, a LAN identifier and a frame size for the second PRP frame in the corresponding RCT fields of the second PRP frame, responsive to verifying that the third electronic device belongs to the first LAN; and
   transmitting the second PRP frame with the sequence number, the LAN identifier and the frame size in the RCT of the second PRP frame to the third electronic device over a different LAN than the first PRP frame.

10. An electronic device in a power generation, transmission or distribution system, comprising:
    a processing circuit operable to:
       generate a first parallel redundancy protocol (PRP) frame for transmission to a remote device over a first local area network (LAN) and a wide area network (WAN), the first PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field;

encode a source MAC address of the electronic device and at least one of a sequence number, a LAN identifier and a frame size for the RCT fields of the first PRP frame into encoded data; and insert the encoded data in at least one of the RCT fields of the first PRP frame in place of at least one of the sequence number, the LAN identifier and the frame size; and transmit circuitry operable to transmit the first PRP frame with the encoded data in the RCT to the remote electronic device.

11. The electronic device of claim 10, wherein the processing circuit is operable to translate the source MAC address of the electronic device from an M-byte initial MAC address value to an N-byte hashed MAC address value using a hashing function, wherein M and N are integers and M>N, and XOR the N-byte hashed MAC address value and at least one of the sequence number, the LAN identifier and the frame size.

12. The electronic device of claim 11, wherein M=6, N=4 and the encoded data occupies all of the RCT fields of the first PRP frame in place of the sequence number, the LAN identifier and the frame size.

13. The electronic device of claim 11, wherein the processing circuit is further operable to modify a length of the hash function based on a number of electronic devices included in the first LAN, so that N corresponds to the number of electronic devices included in the first LAN.

14. The electronic device of claim 10, wherein the processing circuit is operable to access a lookup table which associates source MAC addresses, sequence numbers, LAN identifiers and frame sizes to different encoded data values, and select the encoded data value associated with the source MAC address of the electronic device, and the sequence number, the LAN identifier and the frame size for the RCT fields of the first PRP frame.

15. The electronic device of claim 10, wherein the processing circuit is further operable to verify that the remote electronic device does not belong to the first LAN prior to inserting the encoded data in at least one of the RCT fields of the first PRP frame in place of at least one of the sequence number, the LAN identifier and the frame size.

16. The electronic device of claim 15, wherein the processing circuit is operable to determine that a destination MAC address included in the first PRP frame identifies a local router associated with the first LAN so as to verify that the remote electronic device does not belong to the first LAN.

17. The electronic device of claim 10, wherein the processing circuit is further operable to:
generate a second PRP frame for transmission to the second electronic device over a second LAN different than the first LAN and a WAN, the second PRP frame comprising a source MAC address field, the same packet data as the first PRP frame, and an RCT which is compliant with IEC standard 62439-3 and includes a sequence number field, a LAN identifier field, and a frame size field;

encode the source MAC address of the first electronic device and at least one of a sequence number, a LAN identifier and a frame size for the RCT fields of the second PRP frame into encoded data, wherein the LAN identifier for the first PRP packet identifies the first LAN and the LAN identifier for the second PRP packet identifies the second LAN; and insert the encoded data for the second PRP frame in at least one of the RCT fields of the second PRP frame in place of at least one of the sequence number, the LAN identifier and the frame size for the second PRP frame; and wherein the transmit circuitry is operable to transmit the second PRP frame with the encoded data in the RCT to the second electronic device.

18. The electronic device of claim 10, wherein the processing circuit is further operable to:
generate a second PRP frame for transmission to a third electronic device that belongs to the first LAN, the second PRP frame comprising a source MAC address field and an RCT, the RCT being compliant with IEC standard 62439-3 and including a sequence number field, a LAN identifier field, and a frame size field;

insert the source MAC address of the electronic device in the source MAC address field of the second PRP frame; and insert a sequence number, a LAN identifier and a frame size for the second PRP frame in the corresponding RCT fields of the second PRP frame, responsive to verifying that the third electronic device belongs to the first LAN, wherein the transmit circuitry is operable to transmit the second PRP frame with the sequence number, the LAN identifier and the frame size in the RCT of the second PRP frame to the third electronic device over a different LAN than the first PRP frame.

19. The electronic device of claim 10, wherein the first electronic device is an intelligent electronic device included in the power generation, transmission or distribution system, wherein the second electronic device is a supervisory control and data acquisition (SCADA) system or a centralized protection and control (CPC) system that interfaces with the power generation, transmission or distribution system, and wherein the packet data includes data measured, processed and/or received by the intelligent electronic device.

20. A method of processing a parallel redundancy protocol (PRP) frame transmitted over a wide area network (WAN) and received at a remote electronic device that does not belong to a local area network (LAN) from which the PRP frame originated, the method comprising:
receiving the PRP frame at the remote electronic device, the PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field, wherein the source MAC address field contains a different source MAC address than that of an originating device of the PRP frame, and wherein encoded data is inserted in at least one of the RCT fields of the PRP frame in place of at least one of a sequence number, a LAN identifier and a frame size for the PRP frame;

determining that the PRP frame was transmitted over a WAN;

in response to determining that the PRP frame was transmitted over a WAN, decoding the encoded data contained in the RCT with each MAC address included in a list of MAC addresses accessible by the remote device until a valid LAN identifier is produced by the decoding or the end of the list is reached; and setting an error indicator if a valid LAN identifier is not produced by the decoding.

21. The method of claim 20, wherein determining that the PRP frame was transmitted over a WAN comprises:

determining that the RCT of the PRP frame contains at least one of an invalid sequence number, an invalid LAN identifier and an invalid frame size.

22. The method of claim 20, further comprising:

replacing the encoded data in the RCT of the PRP frame with the decoding results that produce a valid LAN identifier;

replacing the MAC address in the source MAC address field of the PRP frame with the source MAC address of the originating device; and forwarding the PRP frame after making the replacements to an upper layer of a protocol stack for further processing of the PRP frame.

23. A system for interfacing with electronic devices included in a local area network (LAN) that does not include the system, the system comprising:

receive circuitry operable to receive a parallel redundancy protocol (PRP) frame transmitted over a wide area network (WAN), the PRP frame comprising a source media access control (MAC) address field, packet data, and a redundancy control trailer (RCT), the RCT being compliant with International Electrotechnical Commission (IEC) standard 62439-3 and including a sequence number field, a LAN identifier field, and a frame size field, wherein the source MAC address field contains a different source MAC address than that of an originating device of the PRP frame, and wherein encoded data is inserted in at least one of the RCT fields of the PRP frame in place of at least one of a sequence number, a LAN identifier and a frame size for the PRP frame; and processing circuit operable to:

determine that the PRP frame was transmitted over a WAN;

in response to determining that the PRP frame was transmitted over a WAN, decode the encoded data contained in the RCT with each MAC address included in a list of MAC addresses accessible by the remote device until a valid LAN identifier is produced by the decoding or the end of the list is reached; and set an error indicator if a valid LAN identifier is not produced by the decoding.

24. The system of claim 23, wherein the processing circuit is operable to determine that the PRP frame was transmitted over a WAN based on whether the RCT of the PRP frame contains at least one of an invalid sequence number, an invalid LAN identifier and an invalid frame size.

25. The system of claim 23, wherein the processing circuit is further operable to:

replace the encoded data in the RCT of the PRP frame with the decoding results that produce a valid LAN identifier;

replace the MAC address in the source MAC address field of the PRP frame with the source MAC address of the originating device; and forward the PRP frame after making the replacements to an upper layer of a protocol stack for further processing of the PRP frame.

* * * * *